July 11, 1944. F. S. SINCLAIRE 2,353,320
SOUND SYNCHRONIZING APPARATUS FOR MOTION
PICTURES AND PHONOGRAPHIC RECORDINGS
Filed Sept. 17, 1941. 5 Sheets-Sheet 3
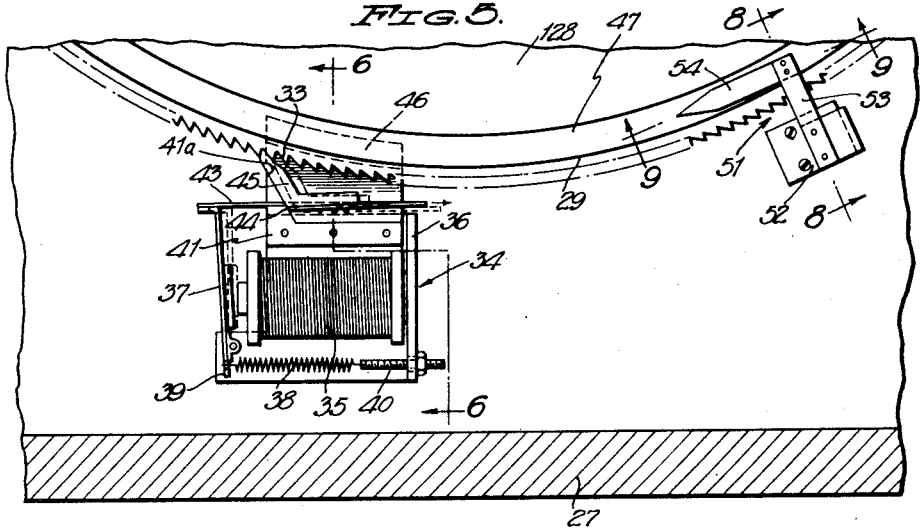
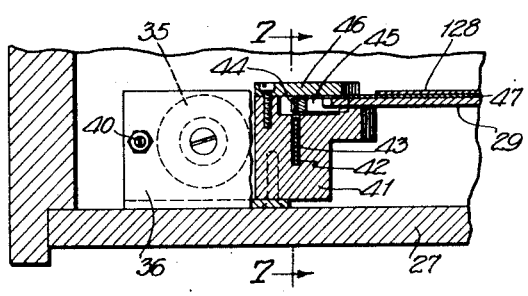
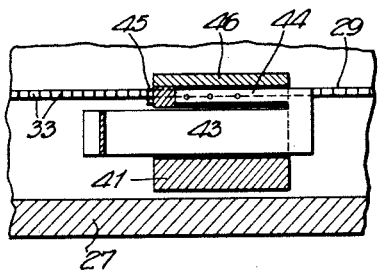
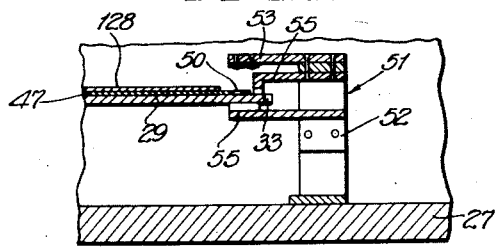
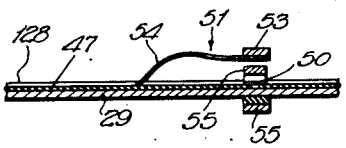
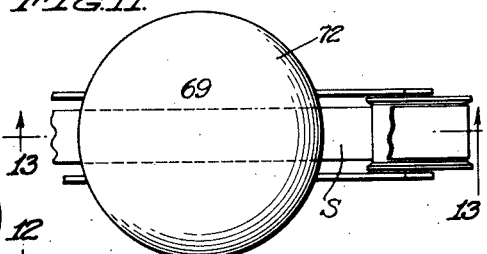
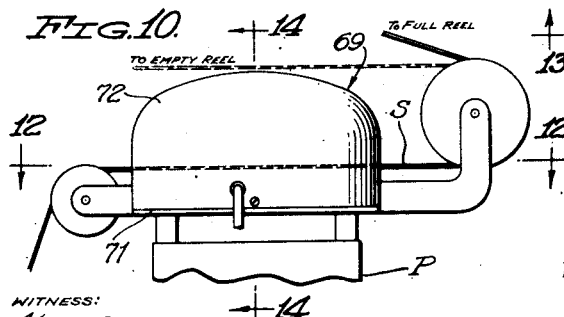
FRANCIS S. SINCLAIRE.
INVENTOR.
BY Ely & Pattison
ATTORNEYS.
WITNESS:

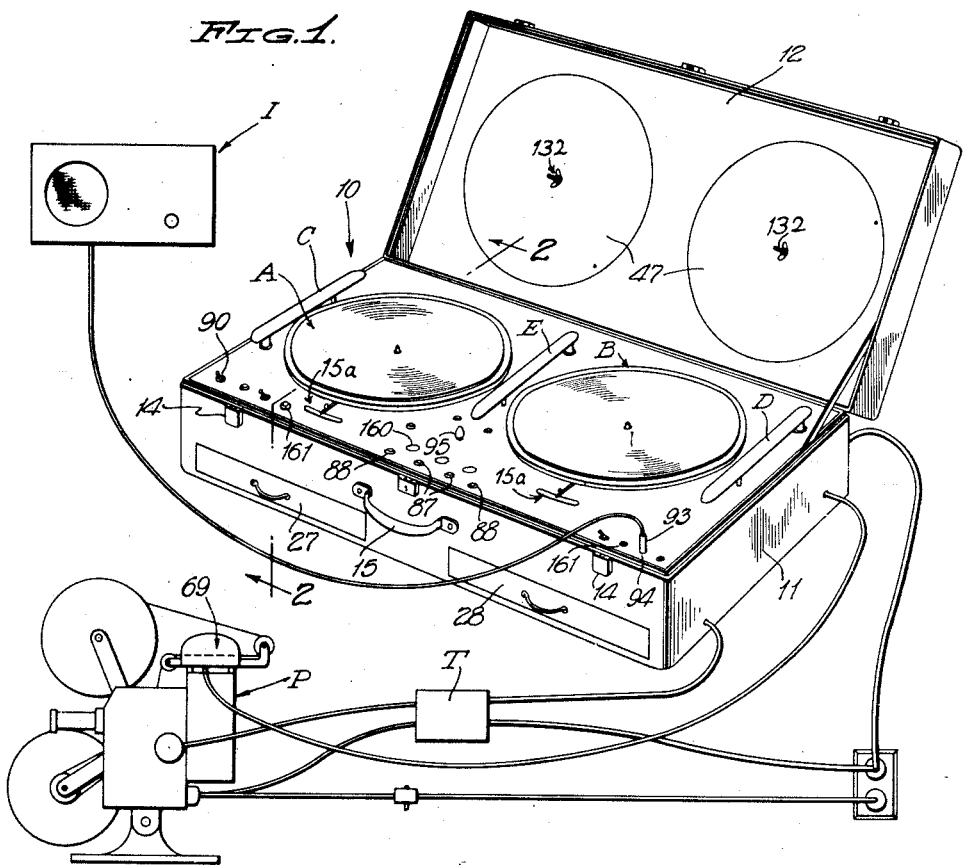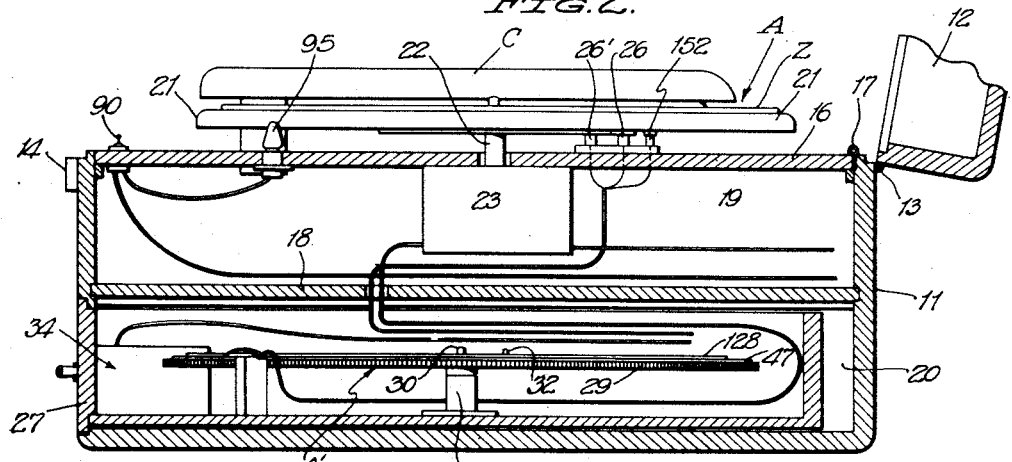

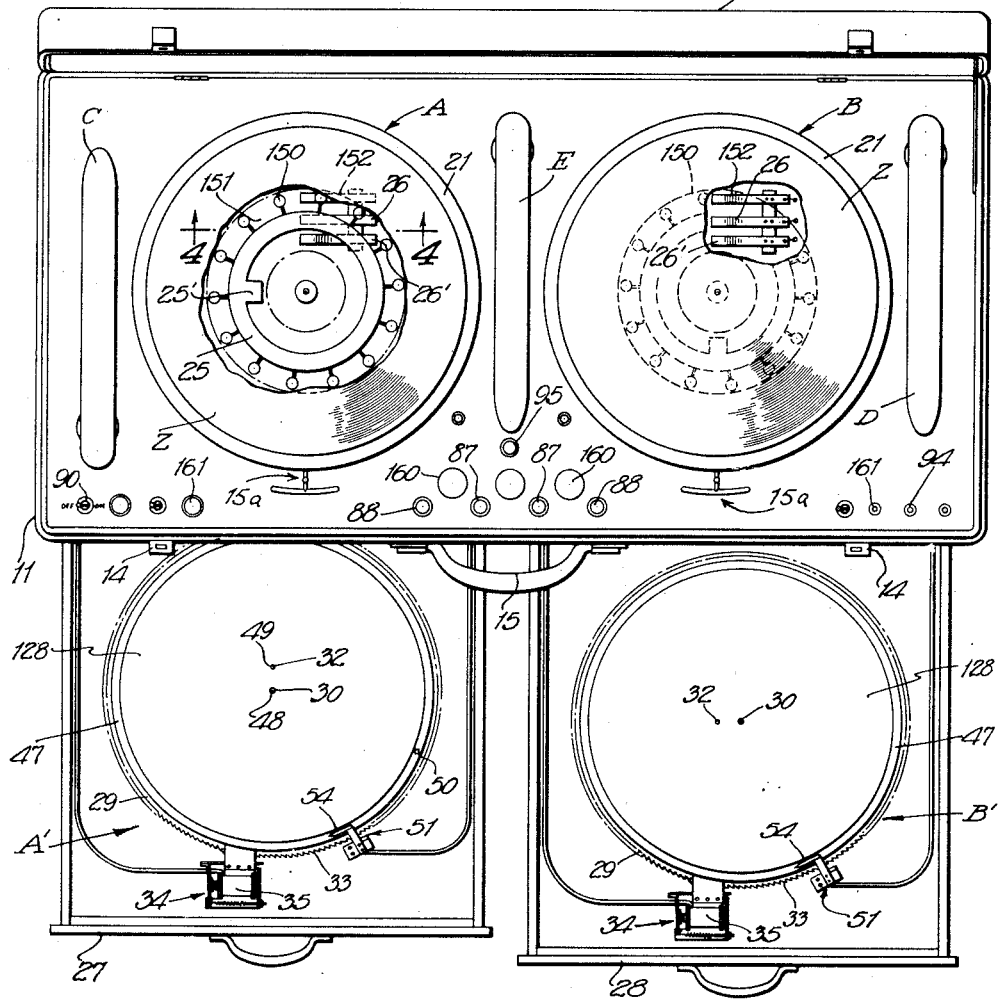
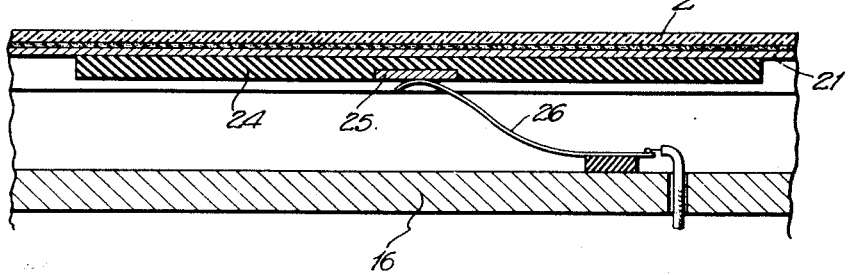

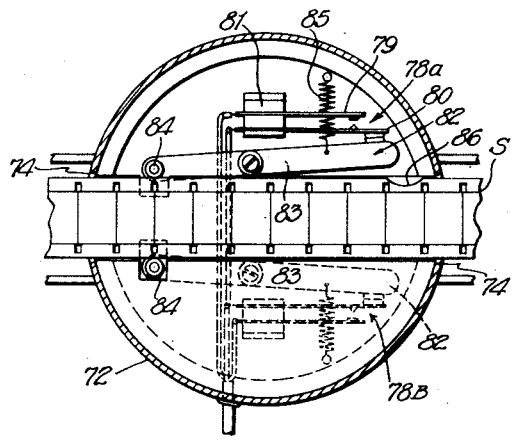
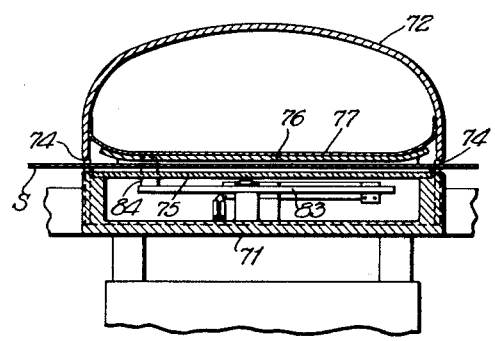
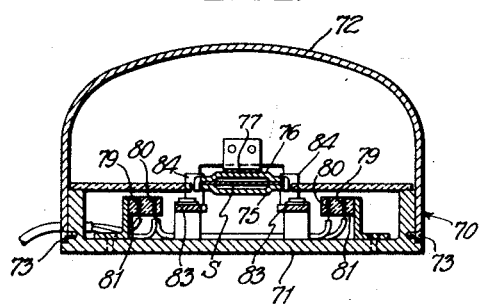
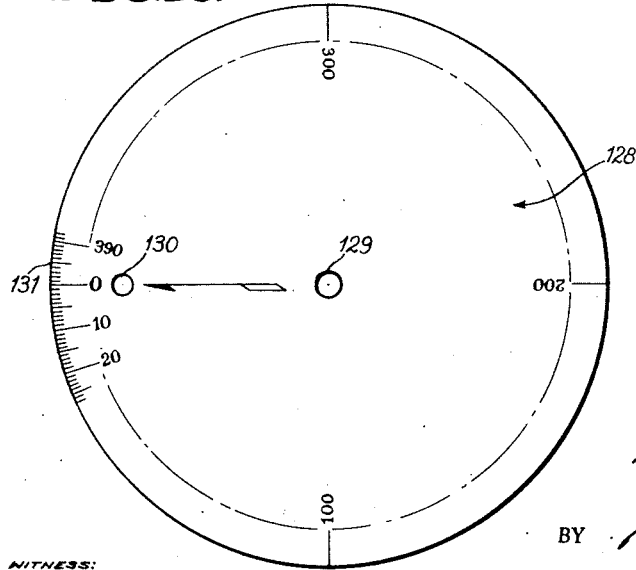
FRANCIS S. SINCLAIRE.
INVENTOR.

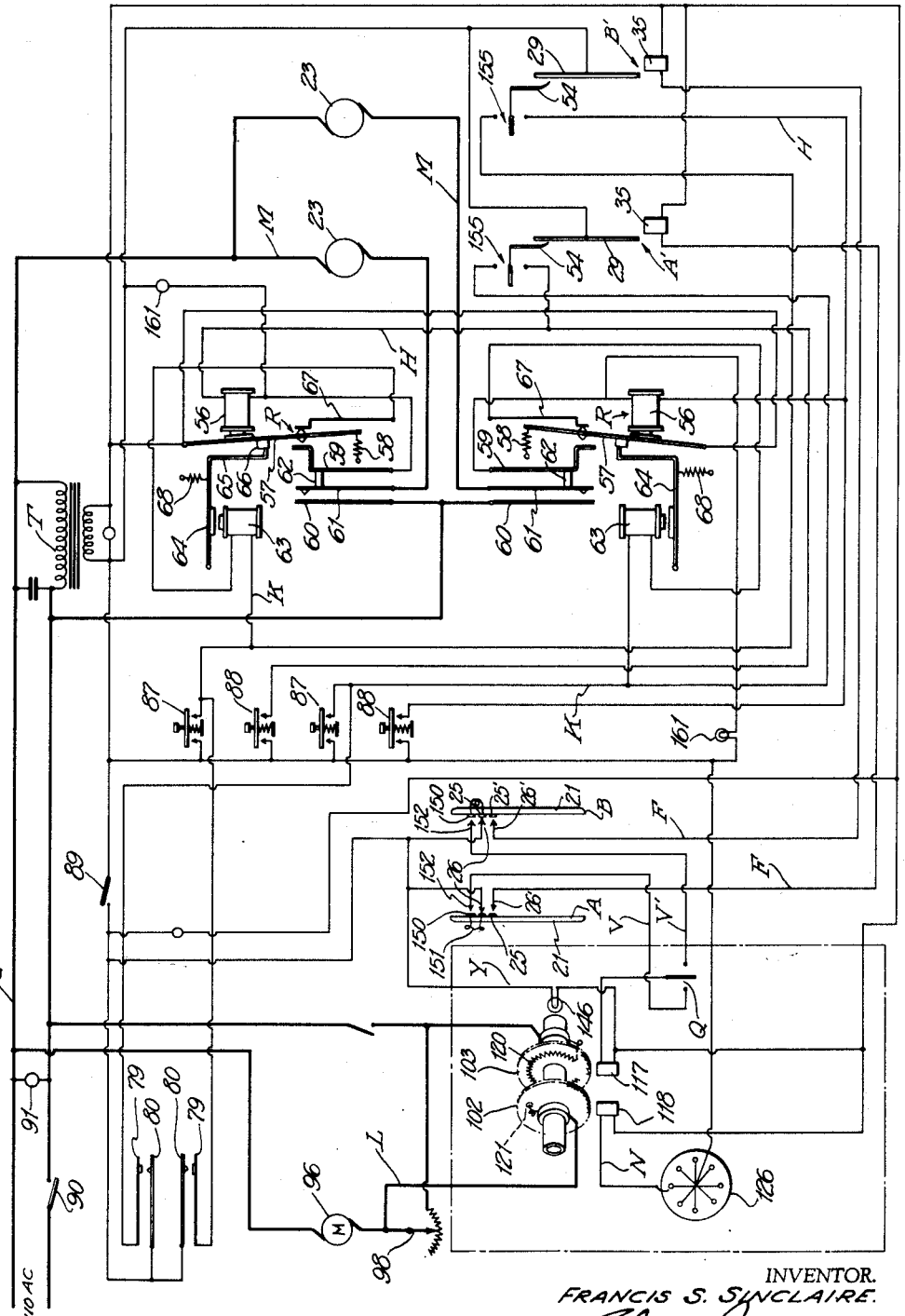

Patented July 11, 1944

2,353,320

UNITED STATES PATENT OFFICE 2,353,320

SOUND SYNCHRONIZING APPARATUS FOR MOTION PICTURES AND PHONOGRAPHIC RECORDINGS

Francis S. Sinclaire, Brooklyn, N. Y.

Application September 17, 1941, Serial No. 411,206

7 Claims. (Cl. 274—10)

This invention relates to improvements in sound synchronization for motion pictures and phonographic recordings, and more specifically to automatic apparatus, as distinguished from the known manual and semi-automatic apparatus, for the continuous playing of sound records in synchronization with the actions of motion pictures when projected upon a motion picture screen, and for the continuous playing of sound records in synchronization and continuity with other sound records.

Some of the important features of the invention reside in an apparatus for synchronizing recorded sound to motion pictures which is relatively inexpensive and therefore applicable for use by amateurs; which is simple of construction and operation so as not to require technical or scientific knowledge by an operator in order to make original recordings of phonographic sound records to be synchronized with showing of a motion picture, nor when the recordings are played during operation of the motion picture projector.

Another feature of the invention is to provide an apparatus for accurately transcribing and timing musical or other sound sequences taken from standard phonograph records, so that such sequences can be accurately placed and timed in conjunction with corresponding sequences of action in the picture; to further provide for accurate initial synchronization and for accurate re-synchronization at predetermined intervals, depending on the type of sequence and the degree of absolute synchronization required; and further, to provide for the adding of synchronization to existing films, either black and white, or color, as well as providing concurrent synchronization for personally taken films.

A still further feature of the invention is the provision of a sound synchronizing apparatus embodying two phonograph record turntables, the starting of which is selectively controlled by the motion picture film as it passes through the projector machine, there being novel means by which the turntables may be stopped at predetermined times to cut the reproduction of sound at any desired point along the length of the sound grooves of the records.

A still further feature of the invention resides in sound synchronizing apparatus which may be used independently of the motion picture projecting apparatus for sound "dubbing," that is, the making of a record of continuous scoring from selected recorded parts of two or more other sound records, the "dubbed" record subsequently being synchronized with the desired sequences of action of a motion picture film.

Other novel features of the invention will appear as the following specification is read in conjunction with the accompanying drawings, in which, Figure 1 is a view partly in perspective and partly in elevation of my improved sound synchronizing apparatus for motion pictures.

Figure 2 is an enlarged vertical transverse sectional view substantially on the line 2—2 of Figure 1.

Figure 3 is a top plan view of the record playing unit with the cover open, and with the drawers containing the turntable stopping control mechanisms shown pulled out.

Figure 4 is an enlarged detail vertical transverse sectional view on the line 4—4 of Figure 3.

Figure 5 is a fragmentary top plan view of the turntable stop control mechanism, a portion of the front wall of the supporting drawer being shown in horizontal section, the ratchet pawl being shown at the limit of its operating position in full lines and in retracted position in dotted lines.

Figure 6 is a vertical sectional view on the line 6—6 of Figure 5, looking in the direction of the arrows.

Figure 7 is a fragmentary vertical sectional view on the line 7—7 of Figure 6.

Figure 8 is a detail vertical sectional view on the line 8—8 of Figure 5.

Figure 9 is a detail vertical sectional view on the line 9—9 of Figure 5.

Figure 10 is an enlarged detail side elevational view of the turntable starting control switch which is associated with the motion picture projector shown in Figure 1.

Figure 11 is a top plan view of the control switch illustrated in Figure 10.

Figure 12 is an enlarged horizontal sectional view on the line 12—12 of Figure 10.

Figure 13 is a vertical longitudinal sectional view on the line 13—13 of Figure 11.

Figure 14 is a vertical transverse sectional view on the line 14—14 of Figure 10.

Figure 15 is a top plan view of the guide disk used in the making of a turntable stop control disk.

Figure 16 is a diagrammatic view of the electrical circuits for controlling the actuation of the automatic sound synchronization apparatus.

Referring to the drawings by reference characters, the numeral 10 designates a phonograph record playing unit, which includes a relatively flat rectangular shaped casing or cabinet 11 to which a cover 12 is hinged as at 13. The casing and cover constitutes a carrying case resembling a suitcase in appearance, the cover being securely closed by the usual luggage hardware such as locks 14, while a handgrip 15 is provided at the front of the casing 11 to facilitate the carrying of the record playing unit 10 from place to place. The casing 11 supports a horizontal top panel 16 which is hinged to the rear wall thereof as at 17 to enable the same to be lifted up to obtain access to underside thereof. The casing 11 is divided by a horizontal partition 18 into an upper compartment 19 and a lower drawer compartment 20. The top panel 16 supports two separate phonograph record turntables A and B. Also supported upon the panel 16 for engagement with phonograph records, when supported on the turntables A and B are sound pick-up devices C and D respectively, there being a third pick-up device E interposed between the two turntables for engagement with a record on either turntable which is required when the unit is employed for continuous "dubbing" of selected parts from selected phonograph records, onto a "dubbed record." The electric wiring of the pick-ups is conventional, and therefor it has not been illustrated in detail. Three volume controls 160 are provided on the panel 16 to regulate the volume of sound picked up and passed on by the three respective sound pickups. The turntables A and B are identical and each includes a flat record supporting disk 21 supported in spaced relation from the panel 16 and which is fixed to a vertical shaft 22 driven by an electric motor 23 supported upon the underside of the disk 21 and disposed concentric therewith is a ring 24 of hard rubber or other di-electric material which has a metal contact ring 25 countersunk in the under face thereof which is provided with a radially inwardly extending contact lug 25'. Fixedly supported upon the panel 16 are spring contact members 26 and 26', the contact 26 having its free terminal and constantly bearing against the underside of the ring 25 while the contact 26' is disposed in the path of the contact extension 25'. The contact ring 25 and extension contact 25' bridge the contact members 26 and 26' once on each revolution of the turntable disk 21 to momentarily close an electric circuit F (Figure 16), there being two of such circuits, one associated with each turntable A and B, and which receive their electrical energy from an electrical power supply line G, the voltage being stepped down from the supply line G to the circuits F—F through a transformer T.

Also countersunk in the underside of the disk 29 is an annular series of spaced contacts 150 which are electrically connected to conductors 151 to the collector ring 25, and which are successively engaged by a fixed contact 152 to provide a make and break for purposes to be hereinafter explained.

Slidably mounted in the compartment 20 for movement through the front wall of the casing 11 are two drawers 27 and 28 respectively disposed beneath the turntables A and B when they are in closed position as illustrated in Figures 1 and 2. The drawers 27 and 28 contain turntable stop switch mechanisms A' and B' respectively, for selectively controlling the stopping of the turntables A and B at any particular turn along the record groove of phonograph records supported thereby. The switch mechanisms A' and B' are identical of construction and operation so that a description of one will suffice for the other.

Each selective stop switch control mechanism A' and B' includes a metal disk 29 which is twelve inches in diameter, the same as the standard twelve inch phonograph records Z to be played on the turntables A and B. The disk 29 is horizontally disposed and rotatably supported upon a vertical pin 30 rising upwardly from a pedestal 31 secured to the bottom wall of the drawer. The pin 30 rises above the top face of the disk 29 as does a second pin 32 which is eccentrically disposed relative to the axis pin 30. A twelve inch phonograph record Z which is cut at ninety-six lines to the inch has approximately four hundred convolute lines of sound track and it is the purpose of the respective stop switch control mechanisms A' and B' to selectively stop the turntables at any one of these lines of sound track. Therefore, the metal disk 29 has its peripheral edge provided with four hundred like ratchet teeth 33, each having a pitch of approximately one-tenth of an inch. An electrically controlled ratchet device 34 is provided for imparting a one-four-hundredths turning movement to the disk 29 upon each complete rotation of its related turntable. The ratchet device 34 is fixedly attached to the inside of the bottom of the drawer and disposed adjacent the ratchet tooth periphery of the disk 29 as best illustrated in Figures 3, 5, and 6. The device 34 includes an electro-magnet 35 supported upon a sound-proof base 36. The base 36 also supports a pivoted armature 37 normally held away from the magnetic core of the magnet by a contractile spring 38 which has one end connected to the tail-piece 39 of the armature while the other end is fixed to a tension adjusting screw 40 threaded on the base 36. Fixed to the base 36 and having a portion underlying the disk 29 is a block 41 provided with a downwardly extending slot 42 through which a thin metal arm 43 extends, one end of said arm being fixedly connected to the free end of the pivoted armature 37 so as to be intermittently reciprocated thereby. Integral with the arm 43 at the other or free end thereof is a leaf spring 44 to which an L-shaped ratchet pawl 45 is fixedly secured, the bill of the pawl being constantly pressed into engagement with the toothed periphery of the disk 29 by the tension of the spring 44. A guide plate 46 is secured to the top of the block 41 and overlies the peripheral edge of the disk 29 to coact with the underlying portion of the block to prevent any possible flexing of the disk adjacent the point of contact of the pawl 45 with the toothed peripheral edge of the disk 29. From the foregoing description, it will be seen that if the electro-magnet 35 is energized the armature will be swung in a direction against the tension of the spring 38, thus increasing the tension upon the spring, such movement of the armature causing the arm 43 to move the pawl 45 in an idling direction a distance equal to that between the shoulders of adjacent ratchet teeth 33, and upon de-energizing of the electro-magnet 35 the tension built up in the spring 38 will impart a rapid propelling force to the pawl 45 which imparts a turning movement to the disk 29 equal to one-four-hundredths of a revolution of the disk. The intermittent energizing and de-energizing of the magnets 35 of the stop switch control mechanisms A' and B' is obtained by arranging the electro-magnets 35—35 in the respective electric circuits F—F. Each circuit F is closed by engagement of the contact plate 25 with the contacts 26—26 on each revolution of the turntable disk 21, thus causing an electric impulse which energizes the electro-magnet 35 to move the pawl 45 to retracted position against the tension of the spring 38. When the contact plate 25 disengages the contacts 26—26, the circuit F is broken, the electro-magnet 35 is de-energized, and the spring 38 imparts a smooth rapid propelling force to the pawl which in turn imparts the predetermined turning movement to the ratchet disk 29. The block 41 is provided with a beveled cam surface 41a, the shape of which controls the action of the pawl 45 by acting as a partial stop to the forward movement of the pawl near the end of its actuating stroke. The surface 41a of the block 41 changes the forward motion of the pawl which is driven by the leaf spring 43 to a sidewise motion toward the center of the disk 29. This drives the pawl tightly into a corresponding ratchet tooth which serves to lock the disk and prevent more than one ratchet tooth passing the point of the block 41 per impulse of the pawl. The inertia of the ratchet disk plus the adjustable tension of the spring prevents the disk from backing up when the pawl is withdrawn. The combination of these effects results in an accurate drive of one tooth per impulse, and at the same time the disk 29 is easily freed to be rotated for purposes of pre-setting when the magnet 35 is in its normal deenergized state.

Each ratchet disk 29 receives a twelve inch diameter switch control disk 47 which is preferably constructed of paper but which may be of any other thin di-electric material. The disk 47 acts as a mask for the top of the metal ratchet disk 29 and has a central hole 48 to fit over the pin 30, and an offset hole 49 to receive the pin 32 whereby the control disk 47 is keyed to the metal disk 29 and turns therewith. The pin 32 and hole 49 also acts to properly position the mask disk 47 upon the disk 29 for the reason that the disk 47 has an aperture 50 selectively punched therein adjacent its peripheral edge, the radial location of which controls the exact sound line of a record at which the turntable is to be stopped. The radial location of the aperture 50 may be punched at any one of four-hundred radial positions, such number being equal to the number of convolute lines of sound track of a twelve inch phonograph record, or equal in number to the four-hundred radial ratchet teeth 33. Fixedly mounted to the floor of each drawer 27 and 28 adjacent the ratchet disks 29 are contact devices 51. Each contact device 51 includes a fixed insulated post 52 attached to the bottom of the drawer, and supported by the post and extending over the disk 29 is an arm 53 which supports a resilient phosphorous bronze contact member 54 which has its free end pointed and normally disposed in contact with the mask disk 47 and in a circumferential plane with the punched aperture 50. Thus as the disk 29 intermittently turns, some place during its complete revolution, the aperture 50 will reach a radial position in alinement with the free end of the contact member 54 to allow the same to pass through the aperture and contact the metal disk 29 and thereby close an electrical circuit for stopping the motor 23 of the particular turntable with which the same is associated. Spaced horizontal guide arms 55—55 extend from the post 52 which respectively overlap the top and bottom sides of the disk 29 adjacent its periphery to prevent accidental flexing of the disk adjacent the contact member 54.

Each metal ratchet disk 29 and its related contact member 54 is arranged in an electric motor control circuit H, there being two of such circuits for selectively controlling the starting and stopping of the phonograph motors 23—23 of the turntables A and B respectively. Electric energy for the circuits H is taken from the electric supply line G through the transformer T, and also arranged in each circuit H is a make and break relay R which includes a solenoid 56, and a pivoted switch member 57 which, under the influence of the solenoid when energized effects a breaking of the circuit H. A spring 58 acts upon the free end of the switch member 57 to restore the same into engagement with a spring contact 59 to effect a closing of the circuit H to energize the solenoid 56. Each circuit H is provided with a circuit reversing switch 155, by which the selective starting and stopping of the turntable may be controlled. Thus, when the contact member 54 makes contact with the metal ratchet disk 29 when the switch 155 is in one position, the circuit H is closed and the relay R operated to break a motor circuit M in which the motor 23 is arranged, there being two motor circuits M, one for each motor associated with the turntables A and B. When the switch 155 is in its other or reversed position it controls the starting of the turntable other than the one which it is intended to stop.

Each motor circuit M receives its electric energy direct from the supply line G and also arranged therein is a pair of normally spaced spring contacts 60 and 61, the latter being flexed into engagement with the contact 60 by movement of the contact 59 when the circuit H is open and the spring 58 has pulled the switch member 57 into engagement with the contact 59, there being a di-electric block 62 preventing contact of the contact 59 with the contact 61. Thus, to start the motor 23 by closing the motor circuit M, the switch contacts 60 and 61 must engage, and this engagement is controlled by a film controlled motor starting circuit K, there being two of such circuits; one for association with each motor circuit M. A pilot light 161 is arranged in each motor circuit M and located on the panel 16.

Each film controlled motor starting circuit K receives its electrical energy from the supply line G through the transformer T and includes an electro-magnet 63 which when energized, actuates a pivoted armature 64 which has an angular extension 65 provided at its free end with a stop block 66 of di-electric material, the latter being disposed in the path of movement of the related switch member 57 and serving to hold the switch member in engagement with a contact 67 also arranged in the circuit K. A spring 68 acts to move the armature 64 away from the magnet 63 to hold the stop block 66 in its obstructing position relative to the switch member 57 which is under the influence of the spring 58. The switch member 57 when in contact with contact 67 forms part of the circuit K, the selective closing of the circuit being automatically controlled by a film control switch device 69 mounted on a moving picture projecting machine P.

The film control switch device 69 includes a housing 70 having a base or bottom wall 71, a removable dome-shaped cover 72 secured to the base by screws 73. The side walls of the housing are provided with alined slots 74—74 for the passage of a sixteen millimeter film strip S. The film is guided in its passage through the housing by a lower fixed guide plate 75 and an upper guide plate 76 which is pressed downwardly by a tension spring 77. Mounted within the housing 70 and respectively disposed beyond the plane of the opposed edges of the film strip S are two like separate switch mechanisms 78a and 78b for respectively closing the circuits K—K to the motors 23—23 of the turn tables A and B respectively. The switch mechanisms 78a and 78b are respectively actuated by opposite edges of the film and a description of one will suffice for the other.

Each of the switch mechanisms 78a and 78b comprises a pair of fixedly spaced spring contacts 79 and 80 mounted in a block 81 of dielectric material, the contact 80 being disposed in the path of the tail end 82 of a rock lever 83. The head end of the lever 83 is provided with a roller 84 which constantly bears against the adjacent edge of the film strip S by the pull exerted on the tail end 82 by a contractile spring 85. So long as the roller 84 engages the straight side edge of the film strip S, the contacts 70 and 80 remain apart and the circuit K in which the said contacts are arranged remains open. However, the edge of the film strip is notched or recessed as at 86 at a predetermined point, and as the notch reaches the roller 84, the same enters the notch by reason of the spring pull on the rock-lever, whereupon the tail end 82 of the lever pushes against and flexes the contact 80 into contacting engagement with the contact 79, thus closing the circuit K and consequently effecting a closing of the related motor circuit M. By predeterminedly notching opposite side edges of the film S, the turntables A and B may be selectively started in motion in synchronization with the picture frames on the film strip S.

The operation of each relay R performs four functions, namely, (1), it starts its related turntable motor 23; (2) it lights the pilot light 161 on the panel 16; (3) it closes circuit K through the contacting of the leaf switch contacts 57—67; and (4) it controls the disconnection of the switch contact 57 from its companion switch contact 59. Thus, the circuit H employed for controlling the starting of the phonograph turntable is rendered inoperative, at which time any further impulses from the film switch have no effect on circuit H and cannot create any buzzing noise in the alternating current solenoid 56.

While the film strip automatically controls the closing of the circuits K—K, they may be manually closed by the actuation of pushbutton switches 87—87 respectively arranged therein and which are conveniently located on the top panel 16 of the record playing unit 10. Likewise, shut-off push button switches 88—88 are arranged in the motor stop circuits H—H to effect manual stopping of the motors 23—23. The manual switches 87 and 88 are intended for use when employing the multi-turntable unit 10 for record "dubbing" purposes. The circuits H and K are provided with a manual switch 89 which is opened when the unit 10 is operated independently of the film control switch. A jewel sight light 161 arranged on the panel 16 lights up when the switch 89 is "on." The power supply circuit G also is under the control of a manually operated switch 90 located on the panel 16, and a jewel sight light 91 is arranged in the supply circuit and located on the panel 16 adjacent the switch 90 to indicate when the current to the unit 10 to "on." The speed of rotation of the turntables A and B may be respectively controlled by manually operated mechanical governors 15a—15a located on the panel 16.

The sound from the phonograph records played on the turntables A and B is picked up by the electric pick-ups C, D, and E, and passed through an electronic amplifier I (Figure 1), the same including an electric cord 92 having a plug 93 inserted into a socket 94 on the panel 16. A neon lamp 95 is mounted on the panel adjacent to and intermediate the peripheries of the turntable disks, said peripheries being provided with markings so that they cooperate with the neon light source to provide a stroboscope by the use of which the speed of rotation of the turntables may be visibly determined.

By reference to Figure 16 it will be seen that the electric motor 96 of the motion picture projector P is arranged in an electrical circuit L, the same receiving its source of electrical energy from the electric supply line G. Also arranged in the circuit L is a manual switch 97 and a manually actuated rheostat 98. The closing of the switch 97 will close the circuit L to start the motor 96 while manual manipulation of the rheostat 98 controls the speed of rotation of the motor. Also arranged in the circuit L are the arcuate resistor 120 and its cooperating contact shoe 121 of an automatic speed synchronizer device 99. The resistor 120 and shoe 121 are respectively mounted in confronting relation upon rotatably mounted ratchet disks 103 and 102 respectively. The rotation of the disks 103 and 102 are respectively actuated by electromagnetic ratchet devices 118 and 117. Intermittent energizing of the magnets of the devices 118 and 117 will impart simultaneous intermittent turning movements to the ratchet disks.

The intermittent energizing of the magnetic devices 118 and 117 are operatively controlled by make and break means associated respectively by the speed of the projector P and the speed of rotation of the turntables A and B. The motor 96 of the projector is adapted to drive a make and break commutator 126 (Figure 16) and the same is arranged in an electric circuit N with the magnet of the device 118. The commutator 126 is so connected with the projector that a definite fixed number of contacts will be made per second when the projector is running at a constant speed of sixteen film frames per second. This particular number of contacts per second coincides with the number of contacts per second set up by the series of contacts 150 provided on the underside of each turntable A and B. The magnet of the device 117 for actuating the rotation of ratchet disk 103 is arranged in two separate circuits V—V' in which the contacts 150 and 152 of the turntables A and B are arranged. The circuits V—V' are selectively closed by a double pole circuit reversing switch Q. The turntables A and B operate at seventy-eight R. P. M. Thus, the connection of the commutator 126 with the projector P is designated to produce the same number of impulses per second when the projector is operating at sixteen film frames per second. The electrical impulses set up in the circuits N and V—V by the speed of the projector P, and the speed of rotation of either of the phonograph turntables A and B energizes both electro magnets of the devices 117 and 118 respectively, an equal number of times per second to correspondingly turn the ratchet disks 102 and 103, whereupon the two ratchet disks rotate at exactly the same speed relative to each other. Should the speed of a turntable or projector vary with relation to each other, one of the ratchet disks will advance relative to the other, thus changing the amount of resistance in the circuit L. From the preceding description it will be understood that by the use of the manually operated rheostat 98, the synchronization point of the whole system can be advanced or retarded as and when the occasion demands. During projection of a film, and without interfering with the operation of either the projector P or turntables A and B, the varying of the manual resistor 98 will cause the projector to lead or lag the rotating turntable by a definite number of picture frames per second, at which point, as determined by an operator, the ratchet disk control rheostat 120—121 will automatically maintain the projector and operating turntable at a constant speed, thus assuring synchronization of the sound produced by records played on the turntables A and B with the projection of motion picture film by the projector P. Furthermore, in operation, whenever the projector P tends to lead or lag in speed with relation to a turntable, the change in relative position of the disks 102 and 103 will increase or decrease the resistance of the resistor 120 which is arranged in the projector motor circuit L, thus the projector speed will be automatically corrected so that it remains in timed relation with the rotation of the turntable.

An electric lamp 146 is arranged in a circuit Y which is closed when the switch 89 is closed so as to always be on to supply illumination for the synchronizer device 99 when the projector and sound reproducing apparatus is operating in combination.

In Figure 15 of the drawings, I have illustrated the master or guide disk 128 for ascertaining the punching of the hole 50 in the insulating stop control mask disk 47. Like the disk 47, the disk 128 is provided with a central aperture 129 to receive the pin 30, and an eccentrically located aperture 130 to receive the pin 32, which pins rise up from the ratchet disk 29. The disk 128 may be made of cardboard, Celluloid or the like and has its upper peripheral edge provided with equidistantly spaced graduations 131 equal in number to the number of ratchet teeth on the ratchet disk 29, namely four hundred. The graduations are numbered in tens from zero (0) to four hundred (400), the zero (0) being in radial alinement with the aperture 130. In order to locate the exact sound groove of a phonograph record at which the supporting turntable is to be stopped, the record playing apparatus 10 is set in operation independently of the projector, thus the operator opens the switch 89. The phonograph record Z to be automatically stopped during subsequent playing in synchronization with the motion picture projector P, is placed, for illustration, upon the turntable A, the mask disk 47 is placed upon the ratchet disk 29 and the guide disk 128 is placed over the disk 47, the disk 128 being slightly less in diameter to expose a portion of the peripheral edge of the disk 47 to facilitate the punching of a hole 50 adjacent the peripheral edge of the disk 47 when the exact radial location for the punching of the hole 50 is ascertained. The manual "on" switch 87 controlling turntable A is pushed, which closes the circuit K which in turn effects a closing of the motor circuit M by the action of the relay R as well as the closing of the circuit H associated with the automatic stop control mechanism A'. The pick-up C is placed upon the phonograph record supported by the turntable A and the sound from the record will be played through the electronic amplifier V. On each revolution of the turntable A and record Z supported thereon, the contact plate 25 will make contact and bridge the spaced contacts 26—26, thus closing the circuit F and momentarily energizing the magnet 35 which actuates the pawl 45 to impart a one-four-hundredths of a turn to the ratchet disk 29 on which the mask disk 47 and guide disk 128 are supported. Should the desired portion of the selection on the phonograph record terminate, for instance, after two hundred turns of the turntable, the ratchet disk 29 would have been actuated a like number of times from a starting position, whereupon the periphery of the disk 47 is punched with a hole 50 opposite the graduation 131 designated two hundred (200). The guide disk 128 may now be removed together with the punched mask disk 47, and the punched disk 47 is marked to identify it with its related phonograph record, the stopping of which it controls when the record is subsequently played in synchronization with the showing of a particular motion picture film by the projector P. In Figure 1, I have shown means 132 in the cover 12 by which the mask disks may be conveniently stored for use as and when desired.

From the foregoing, it will be seen that the film control switch device 69 selectively controls the starting of the phonograph motors when the record playing unit 10 is operatively connected with the motion picture projector P. Thus, phonograph records may be placed upon the turntables A and B and by suitably positioning the circuit making elements along the film strip, sound sequence number one on turntable A may be played, and automatically stopped by the location of the hole 50 in the mask disk 47, whereupon sound sequence number two on turntable B may immediately follow, during which time sound sequence number three may be placed on turntable A after removal of sound sequence number one, etc. Several odd or even numbered sequences may be cut as a continuous recording by permitting a sufficient number (about six) of blank grooves between each sequence and proper punching of the mask disk will permit of each sequence being picked up in proper synchronization without the necessity of changing the record each time. Thus a full four hundred foot reel of pictures can easily be synchronized from two twelve inch records cut at 33⅓ R. P. M. While this synchronizer is fully automatic for periods of from eighteen to twenty-two minutes, further continuous operation requires the changing of one record every ten to twelve minutes. The minimum length of a sequence and consequently the maximum frequency of re-synchronization can be as short as ten seconds or four feet of sixteen millimeter film and it is entirely independent of the speed at which the film is traveling through the projector. By successive sequence, continuous sound may be produced in synchronization with a full length of a motion picture film. However, a momentary lapse of time is allowed in the event that the projector has traveled slightly faster than the turntable, so that the sequence may be completed on one turntable before a new sequence is picked up on the next turntable. Such a lapse is common in professional sound films, but is not noticeable.

The ratchet disk circuit reversing switches 155 act to increase the scope and usefulness of the invention. In its normal position each switch 155 closes the motor actuating circuit H, such as for instance the switch 155 of ratchet device A' causes turntable A to stop and likewise switch 155 of ratchet device B' controls the stopping of turntable B. However, when the switch 155 of device A' is reversed, it closes the motor actuating circuit H of turntable B and starts the operation of the same. The same action takes place when switch 155 of device B' is reversed, for it will actuate circuit H by which turntable A is started. Thus, for example, by properly perforating the di-electric disk 128 of ratchet device A' and also properly marking the starting point on the record placed on turntable B, it is possible to start turntable B to play the record thereon in perfect continuity with and in synchronization with the completion of any theme which may be on the record on turntable A. Thus multi-record albums of standard popular symphonic or operatic masterpieces which are "cut" with 1-3, 2-4 scoring can be played to completion as a single uninterrupted unit. This feature is also very useful in preparing records for motion picture work.

By means of the manual control switches 155, I am able to start a second turntable upon stopping of a first turntable which facilitates the continuous uninterrupted playing of commercial multi-record recordings. I also wish to point out that this feature will not only start the second record in perfect continuity with the first, but it will also start the second record at any fixed time interval after the first has ceased to play. This ability to definitely space the time interval between the playing of any record and the next subsequent record should be useful to radio broadcasting studios in the broadcasting of recorded programs. It will enable the arrangement of a program of recorded music in which the completion of the last record will exactly coincide with the end of the allotted program time, and the spacing of the records will be smooth and even.

I also wish to point out that the speed synchronizer device 99 is used in this instance to maintain the projector in proper constant speed relationship with the operating turntable during projection when lip synchronization is required for periods of longer than about a minute duration. Relatively long lip synchronizations require that the camera which takes the picture be motor driven, and that the speed synchronzier device be likewise used in association with the camera to maintain the camera and recording turntable at proper speeds when taking the picture.

While I have illustrated herein, an electrical coupling for synchronizing the ratchet actuated devices A and B, I wish it to be understood that any conventional mechanical, or part mechanical and part electrical coupling means may be used in association with the other novel features of the invention if so desired.

Further advantages of this apparatus are:

I. It can be used independently as a manually operated sound "dubbing" system for continuous scoring, and for music preceding and following the showing of the picture without interfering with its use as a synchronizer.

II. By manually operating the turntable and volume controls, a continuous cutting can be made by feeding the output of the unit 10 to any standard recorder so as to obtain a clean-cut record which does not have starting and stopping noises which are very difficult to provide against, especially at 78 R. P. M.

III. By watching the graduations 131 on the guide disk 128 as a record is being played, the exact turn or point at which any sequence starts or stops on any record can be ascertained and on replaying the record this particular sequence can be accurately lifted out and recut for use in synchronization with a suitable sequence of motion picture film.

IV. This complete sound system including a supplementary recorder, amplifier and speaker system, and a supplementary motor drive for the camera, will compare favorably in price with the cheapest practical system on the market today.

V. This is the only non-professional system, to my knowledge, which will permit scoring in reasonable accurate sychronization for film which have already been made, as well as future films.

VI. By means of using turntable motors which will operate at 78 R. P. M. as well as 33⅓ R. P. M. and which have variable speed controls, the duration of any sound sequence may be extended or contracted to a certain extent without serious loss of quality, so that sequences filmed at one time may be compensated and synchronized with sound effects recorded at a different time with a reasonable degree of accuracy, by means of recutting from a record played at a slower or faster speed than the original cut.

VII. Also by means of the variable speed, trick sound effects may be produced, such as a rapid speech, which is made by playing a normal record cut at 33⅓ R. P. M. at about 50 R. P. M., and recutting again at normal speed, which gives a rapid, high-pitched voice. This procedure may be reversed to give a low, deep-pitched voice.

VIII. Because of the compensating feature of this machine as pointed out in paragraph VI and also because of its novel relatively high frequency of positive re-synchronization (about once every ten seconds), it is possible to make satisfactory lip synchronizations of speech sequences of almost any length by using nothing but the ordinary spring driven camera when taking the picture. For example; the written speech is spoken during the filming of the picture. Later at some convenient time the written speech is repeated into the microphone and a cutting is made. The number of frames any section or part of this speech may be out of synchronization with the film is measured with the speed synchronizer. The turntable, by means of its stroboscope, is set to compensate for any error in synchronization and a corrected cutting is made. Finally, the corrected cutting is synchronized to the film.

IX. The ratchet disk 29, instead of being driven directly from its circumference, may be driven through a chain of gears or other mechanism. However, the perforations are fairly close together and each additional gear introduces a certain amount of play or loss of motion which might cause inaccuracies, unless very carefully made. Further, the action of this disk must be discontinuous or of the ratchet type, as a smooth continuous action would be subject to inaccuracies due to the difficulty of punching the holes in the insulating disk at exactly the proper spot. With discontinuous action, such as I have, extreme accuracy in punching is not necessary.

X. This apparatus provides a means for the average user to correct any mistakes in synchronization by the simple procedure of re-notching the film or re-punching the insulated disk 47 and therefore this apparatus is so flexible that no technical or mechanical ability is required other than that already at the command of the average person who is able to operate a projector and make a home recording.

In the event that an aperture 50 is punched in the insulating disk 47 in error, it can easily be repaired by sticking a piece of paper or Scotch tape over the incorrect aperture and re-punching. Likewise, an error in punching the film can be repaired satisfactorily by wrapping a narrow piece of clear Scotch tape around the film to cover the incorrect notch and then re-notching it.

XI. A further advantage of this system is that it does not require the copying of any film. It can be used equally well with black and white or color film, both now on hand and to be made. It does not require for good sound synchronization that film shall be run at twenty-four fames per second instead of sixteen with the additional cost of film entailed therein, and it is particularly adaptable to the synchronization of the original film.

By means of a slight change in the film switching mechanism, this synchronizer can be adapted to eight millimeter film without any loss of tone quality.

XII. For convenience in operation, the ratchet switches 34 are mounted in a drawer which slides in under the turntables. These drawers can be pulled out momentarily while the switches are being set and then closed out of the way while the synchronizer operates.

XIII. By means of a small neon light 85 mounted on the panel 16 between the two turntables and providing stroboscopic markings on the rims of the turntables, these turntables can be accurately set at the proper speeds of 78 or 33⅓ R. P. M., or at accurate speeds within about five percent of these speeds.

XIV. Loss of synchronization due to damage to the film can easily be corrected by re-notching the film. Likewise, loss of synchronization due to the phonograph needle jumping a groove on the record can be corrected by temporarily adjusting the speed synchronizer. In any even, loss of synchronization due to film defects need only continue through one sequence.

XV. This machine can be plugged into and played through a sound projector. Therefore, it is possible by simply fading from the sound track on the sound film to the pickups on this synchronizer to show a picture consisting of sequences scored partly by the sound track on the film and partly by this machine. There are two main advantages of this combination scoring. First; because of the superior sound editing features of this machine, pictures taken without sound can be subsequently scored for sound much more accurately and effectively than they can be subsequently scored by sound on film systems and, second; the use of this machine for scoring such sequences eliminates the necessity of copying the film in order to combine the new sound track with it and the concurrent loss of picture quality entailed therein. The large saving in cost of copying such film could easily justify the purchase of this machine by users of sound on film systems.

While I have shown and described what I consider to be the preferred embodiment of my invention, I wish it to be understood that such changes in structure and design as come within the scope of the appended claims may be resorted to if desired, without departing from the spirit of the invention as set forth in the appended claims.

Having thus described the invention, what I claim as new and desire to secure by Letters Patent of the United States, is:

1. In a phonograph record playing apparatus, a rotatable turntable adapted to support a sound record to be reproduced, an electric motor circuit including a source of electrical energy, an electric motor arranged in said circuit for imparting driving rotation to said turntable, switch means for closing said electric motor circuit, an automatic stop mechanism including a rotatable contact disk, a control disk of di-electric material supported upon and overlying the contact disk for turning movement therewith, said control disk having an aperture adjacent its periphery to expose a portion of the contact disk, electrically actuated means responsive to each revolution of said turntable to impart a predetermined turning movement to said contact disk, a spring contact member is pressing engagement with the upper side of the control disk and being disposed in the circumferential path of said aperture for passage therethrough to contact said contact disk when the aperture registers with the contact member, an electric stop circuit including a source of electrical energy, said contact disk and contact member being arranged in said circuit, and means also arranged in said stop circuit and operable upon closing of the same by contact of the contact disk and contact member to effect opening of the motor circuit and consequently stopping the rotation of the turntable.

2. In a phonograph record playing apparatus, a rotatable turntable, an electric motor circuit including a source of electrical energy, an electric motor arranged in said circuit for rotating said turntable, a control switch arranged in said circuit for closing the same to energize said motor, an automatic stop mechanism for stopping the rotation of said turntable including a rotatable ratchet disk, an electro-magnetically actuated pawl engaging the ratchet teeth of said ratchet disk, an electric circuit including a source of electric energy and in which the electro-magnetically actuated pawl is arranged, a make and break switch arranged in said last circuit and operable on each revolution of said turntable for intermittently closing said last circuit and correspondingly energizing said electro-magnetically actuated pawl, and electrically controlled means responsive to a partial predetermined degree of turning movement of the ratchet disk for effecting an opening of the motor circuit to correspondingly stop the rotation of said turntable.

3. In an automatic stop mechanism for phonographs, a rotatable turntable, an electric motor for rotating said turntable, a normally open electric motor circuit including a source of electric energy and a control switch, said motor being arranged in said circuit, motor starting means for closing the switch to close said circuit to cause said motor to operate said turntable, a rotatable ratchet disk, an actuating pawl engaging the ratchet teeth of said ratchet disk, an electro-magnetic device for actuating said ratchet pawl, an electric circuit including a source of electric energy, said electro-magnetic device being arranged in said last named circuit, a bridge contact provided on the underside of said turntable, a pair of fixed spaced contacts disposed in the circumferential path of said bridge contact and also arranged in said last circuit whereby said last circuit will be closed on each revolution of said turntable to intermittently energize said electro magnetic device, and electrically controlled means responsive to a predetermined turning movement of said ratchet disk within a range of a complete revolution thereof to effect an opening of the control switch and the consequent opening of the motor circuit to stop the operation of the motor and rotation of the turntable.

4. In a phonograph apparatus, a casing having a top panel, a drawer horizontally slidable into and out of said casing and disposed beneath said top panel, a record playing turntable disposed above said top panel, an electric motor disposed beneath said top panel for rotating said turntable, a make-and-break electric switch operable on each revolution of said turntable, a ratchet contact disk rotatably mounted in said drawer, an electrically actuated ratchet pawl device for imparting intermittent ratchet turning movement to said contact disk, an electric circuit in which the make-and-break switch and the electrically actuated ratchet pawl device are arranged whereby intermittent closing of the circuit by the make-and-break device will cause the ratchet pawl device to impart intermittent turning movements to said ratchet contact disk, a control disk of di-electric material positioned over the ratchet disk and having a hole therein adjacent its periphery to expose a portion of the metal contact disk, a fixed spring contact member pressing against the upper face of the control disk and having its free end disposed in the circumferential plane of the hole for passage therethrough when the hole registers with the contact member, an electric circuit including a source of electrical energy in which said contact member and said contact disk are arranged, a relay in said circuit; a motor circuit including a source of electric energy in which said motor is arranged, a normally closed switch in said motor circuit and being operable upon the operating influence of said relay, whereby closing of the first circuit by engagement of the contact member and contact disk will energize said relay to cause the motor switch to open and thereby stop the operation of said motor.

5. In an apparatus of the class described, a sound reproducing device including a rotatable element; an electric motor circuit including a source of electrical energy, an electric motor arranged in said circuit for imparting driving rotation to said rotatable element, switch means for closing said electric motor circuit; an automatic stop mechanism including a movable contact member, a control member of di-electric material superposed upon and movable with the contact member, said control member having an aperture to expose a portion of the contact member, electrically actuated means responsive to each revolution of the rotatable element to impart a predetermined intermittent movement to said contact member, a spring contact element in pressing engagement with the control member and being disposed in the path of said aperture for passage therethrough to contact said contact member when the aperture registers therewith, an electric stop circuit including a source of electrical energy, said contact member and spring contact element being arranged in said last named circuit, and means also arranged in said stop circuit and operable upon closing of the same by contact of the spring contact element with the contact member to effect opening of the motor circuit to stop the movement of the rotatable element.

6. In a phonograph playing apparatus, a rotatable element adapted to support a sound record to be reproduced, driving means for rotating said rotatable element, stop means for the rotatable element, an automatic stop control mechanism including a rotatable carrier member, a control disk element removably carried by the rotatable carrier member for turning movement therewith and having a starting indication thereon, means responsive to each complete revolution of the rotatable element to impart a predetermined turning movement to the rotatable carrier member, and means predeterminedly positioned circumferentially upon the control disk element relative to the starting indication thereon for effecting operation of said stop means.

7. In an apparatus for effecting an uninterrupted sequential rendition of a multiple of selected portions of two phonograph records, a pair of phonograph reproducing devices, each of said devices including a rotatable turntable adapted to rotate a maximum predetermined number of revolutions to complete the rendition of a standard phonograph record carried thereby, a single selective multiple presetting stop mechanism associated with the turntable of each of the phonograph reproducing devices for controlling the stopping of the turntables at the multiple selected stop settings within the range of the maximum number of revolutions aforesaid, said single selective multiple presetting stop mechanism including a rotatable annular contact member, a control disk member of di-electric material superposed upon and rotatable with the contact member, said control member having openings therein disposed in the same circumferential plane to expose portions of the contact member, electrically actuated means responsive to each revolution of the rotatable element to impart a predetermined intermittent turning movement to said contact member, a spring contact element in pressing engagement with the control member and being disposed in the path of the apertures for passage therethrough to contact said contact member when the apertures successively register therewith, the multiple selected stop settings of one stop mechanism being in alternate sequential order with respect to the stop settings of the other stop mechanism, and operating means associated with both phonograph reproducing devices and being responsive to the actions of the presetting stop mechanisms, each of which is responsive to the presetting mechanism of the other turntable.

FRANCIS S. SINCLAIRE.